(12) United States Patent
Ozdemir et al.

(10) Patent No.: US 8,861,306 B2
(45) Date of Patent: Oct. 14, 2014

(54) INTERPOLATING SEISMIC DATA

(75) Inventors: Ahmet Kemal Ozdemir, Asker (NO);
Ali Ozbek, Milton (GB); Massimiliano Vassallo, Brighton (GB)

(73) Assignee: WesternGeco L.L.C., Houston, TX (US)

( * ) Notice: Subject to any disclaimer, the term of this patent is extended or adjusted under 35 U.S.C. 154(b) by 736 days.

(21) Appl. No.: 12/168,125

(22) Filed: Jul. 5, 2008

(65) Prior Publication Data

US 2010/0002541 A1 Jan. 7, 2010

(51) Int. Cl.
*G01V 1/36* (2006.01)

(52) U.S. Cl.
CPC ..................... *G01V 1/36* (2013.01); *G01V 2210/57* (2013.01)
USPC .................. 367/21; 367/73; 702/14

(58) Field of Classification Search
USPC .................. 367/21, 24, 73; 702/14
See application file for complete search history.

(56) References Cited

U.S. PATENT DOCUMENTS

| | | | |
|---|---|---|---|
| 4,837,723 A | 6/1989 | Peacock | |
| 5,012,453 A * | 4/1991 | Katz | 367/57 |
| 5,617,372 A * | 4/1997 | Gulunay et al. | 367/38 |
| 5,771,203 A * | 6/1998 | Soubaras | 367/46 |
| 5,978,647 A * | 11/1999 | Weinberg | 434/6 |
| 5,995,906 A * | 11/1999 | Doyen et al. | 702/16 |
| 6,292,755 B2 * | 9/2001 | Chambers et al. | 702/17 |
| 6,510,390 B1 | 1/2003 | Bunting et al. | |
| 6,859,734 B2 * | 2/2005 | Bednar | 702/14 |
| 6,903,998 B2 | 6/2005 | Vaage | |
| 7,107,188 B2 * | 9/2006 | Veneruso et al. | 702/187 |
| 7,639,564 B2 * | 12/2009 | Paffenholz et al. | 367/38 |
| 7,890,265 B2 | 2/2011 | Coleon | |
| 2009/0245021 A1 * | 10/2009 | Robertsson et al. | 367/21 |
| 2010/0329077 A1 | 12/2010 | Özbek et al. | |

FOREIGN PATENT DOCUMENTS

WO 2008008632 1/2008

OTHER PUBLICATIONS

Lang, "Kriging Interpolation", Apr. 24, 2001.*
Zwartjes et al. "Fourier reconstruction of nonuniform sampled, aliased seismic data", Geophysics, vol. 72, No. 1, Jan.-Feb. 2007.*
Duijndam, et al., Irregular and Sparse Sampling in Exploration Seismology. 2001, Book Chapter in Zhang, Non Uniform Sampling: Theory and Practice, Kluwer Academic /Plenum Publishers, New York, USA.
Dave Hale, Resampling Irregularly Sampled Data, Stanford Exploration Project, SEP-25, 1980, pp. 39-58.
Yen J. L., On Nonuniform Sampling of Bandwidth-Limited Signals, IRE Trans. Circuit Theory, 1956, pp. 251-257.
Zhang L., Interpolation and Fourier Transform of Irregularly Sampled Data, Stanford Exploration Project, SEP-72, Dec. 18, 1997, pp. 1-84.
Zwartjes et al., Fourier Reconstruction of Non-Uniformly Sampled Aliased Data, 74th Annual International Meeting: Society of Exploration Geophysicists., 2004.
PCT Search Report, dated Mar. 8, 2010, Application No. PCT/US2009/049426.

(Continued)

Primary Examiner — Ian J Lobo

(57) ABSTRACT

A technique includes modeling interpolated seismic measurements as a random process characterized by seismic measurements acquired at a set of sensor locations and an interpolation error. The technique includes determining the interpolated seismic measurements based at least in part on a minimization of the interpolation error.

16 Claims, 7 Drawing Sheets

(56) References Cited

OTHER PUBLICATIONS

Extended European Search Report of European Application No. 09794992.9 dated Oct. 15, 2013: pp. 1-8.

Examination Report of Australian Application No. 2009268798 dated Oct. 15, 2013: pp. 1-4.

Hansen et al., "Subsurface property interpolation in multi attribute space—Porosities on the South Arne Field," SEG/New Orleans Annual Meeting, 2006: pp. 1861-1865.

* cited by examiner

INTERPOLATING SEISMIC DATA

BACKGROUND

The invention generally relates to interpolating seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

In exploration seismology, although the time coordinate is regularly or non-uniformly, sampled, spatial coordinates are typically irregularly, or non-uniformly, sampled due to the presence of obstacles in the land environment or strong currents that are present in the marine environment. Thus, for example, for the marine environment, even with the latest steering technology, it may not be possible to maintain the streamers parallel to each other. Furthermore, the seismic sensors in a given streamer may not be equidistantly spaced apart. Hence, the inline sampling may also be quite non-uniform.

The regularization of seismic data typically is very important, especially in time-lapse survey matching, multiple suppression and imaging. If the irregular nature of the sampling grid is ignored or handled poorly, notable errors may be introduced, and the errors may be further amplified at later stages of the seismic data processing chain.

SUMMARY

In an embodiment of the invention, a technique includes modeling interpolated seismic measurements as a random process that is characterized by seismic measurements acquired at sensor locations and an interpolation error. The technique includes determining the interpolated seismic measurements based at least in part on a minimization of the interpolation error.

In another embodiment of the invention, an article includes instructions stored on a computer accessible storage medium that when executed by a processor-based system cause the processor-based system to model interpolated seismic measurements as a random process that is characterized by seismic measurements acquired at sensor locations and an interpolation error. The instructions when executed cause the processor-based system to determine the interpolated seismic measurements based at least in part on a minimization of the interpolation error.

In yet another embodiment of the invention, a system includes an interface to receive seismic measurements acquired at non-uniformly spaced sensor locations. The system includes a processor to model interpolated seismic measurements at uniformly spaced locations as a random process that is characterized by the seismic measurements acquired at the non-uniformly spaced sensor locations and an interpolation error. The processor determines the interpolated seismic measurements based at least in part on a minimization of the interpolation error.

Advantages and other features of the invention will become apparent from the following drawing, description and claims.

DETAILED DESCRIPTION

Figure 1:
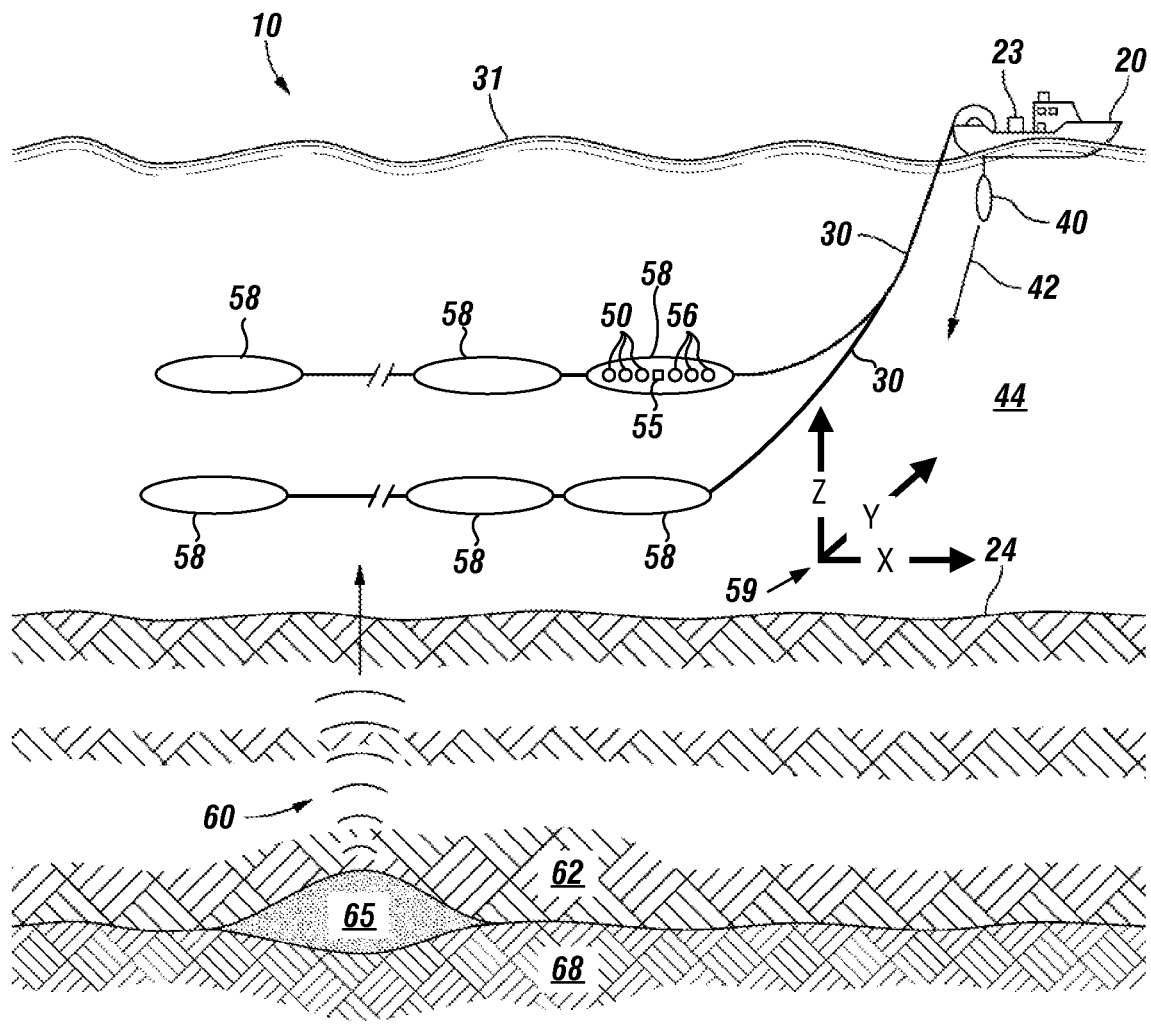
FIG. 1 is a schematic diagram of a marine acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (two exemplary streamers 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

In accordance with embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensors. Each pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 7:
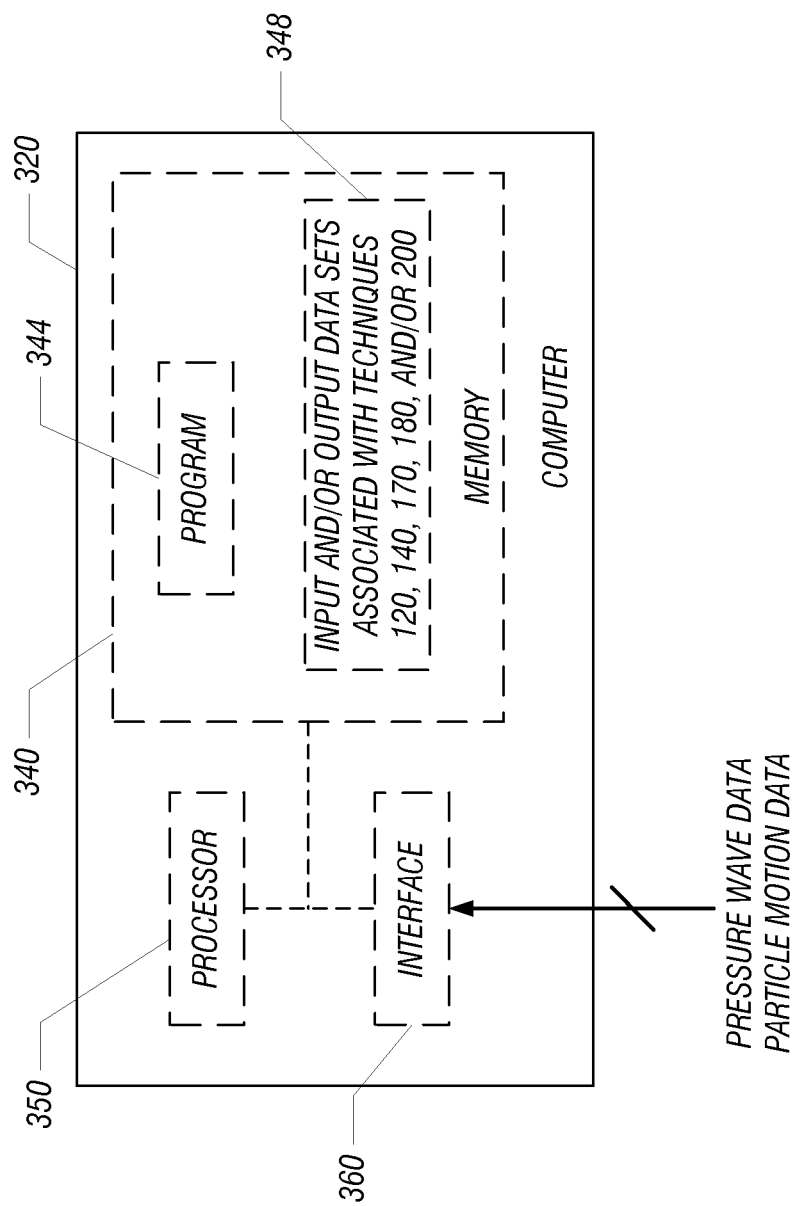
FIG. 7 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 7 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data that is provided by the multi-component seismic sensors 58 allows the recovery of "ghost" free data, which means data that is indicative of the upgoing wavefield.

Due to wave and possibly other effects, the pressure and particle motion measurements typically are acquired at irregularly, or non-uniformly, spaced sensor locations. In other words, the actual sensor locations do not resemble idealized locations on a uniform grid. Therefore, before the pressure and particle motion measurements that are acquired by the seismic sensors are processed (for such purposes of survey matching, multiple suppression and/or imaging, as examples), the measurements are interpolated to produce interpolated measurements at idealized, uniformly spaced locations.

Particle motion and pressure wavefield signals that are continuous in the inline (x), crossline (y) and depth (z) directions may be constructed from the sampled pressure and particle motion measurements. The Whittaker-Kotel'nikow-Shannon sampling theorem states that any signal f(x) can be reconstructed from its uniformly spaced samples if the sampling interval is less than half the period of the highest frequency component in that signal. Thus, if f(x) is bandlimited to the wavenumber $\sigma/2$, which is known as the Nyquist wavenumber, then the sampling theorem provides the following formula to interpolate any function value from uniformly spaced values $f(m/\sigma)$:

$$f(x) = \sum_{m=-\infty}^{\infty} f(m/\sigma)\text{sinc}(\sigma x - m), \quad \text{Eq. 1}$$

where "sin c(x)," in general, refers to the expression $\sin(\pi x)/\pi x$. Thus, when the sampling rate is sufficient and there is no aliasing, the sampling theorem provides a way to reconstruct the continuous signal "exactly" from its uniformly spaced samples. To satisfy requirements of the sampling theorem, the signal is sampled at a rate greater than twice the Nyquist rate, i.e., $\sigma$. Moreover, the seismic signal may be represented as follows:

$$f(x) \approx f_L(x) = \sigma \sum_{m=0}^{L-1} \Delta x_m f(x_m)\text{sinc}(\sigma(x - x_m)), \quad \text{Eq. 2}$$

where "$\Delta x_m$" is the Jacobian weight (i.e., $\Delta x_m = x_{m+1} - x_m$); and "$f(x_m)$" the value of the seismic data at an irregulator offset called "$x_m$." It is important to note that, when $\Delta x_m = 1/\sigma$, the sin c interpolator of Eq. 2 is exact due to the following relationship that is set forth by the Whittaker-Kotel'kikov-Shannon theorem:

$$f(x) = \sum_{m=-\infty}^{\infty} f(m/\sigma)\text{sinc}(\sigma(x - \tau)). \quad \text{Eq. 3}$$

On the other hand, when $\Delta x_m$ is not equal $1/\sigma$, the sin c interpolator provides only a crude approximation to the continuous signal. For such cases, it has been found that a better approach is to not obtain the continuous signal, but rather, this other approach involves inverting Eq. 1 to obtain the discrete, uniformly spaced signal values $f(m/\sigma)$. This inversion may be written in matrix notation as follows:

$$h \equiv \begin{vmatrix} f(x_1) \\ f(x_2) \\ \vdots \\ f(x_L) \end{vmatrix} \approx \begin{vmatrix} s_{11} & s_{11} & \cdots & s_{1L} \\ s_{21} & s_{21} & \cdots & s_{2L} \\ \vdots & \vdots & \cdots & \vdots \\ s_{11} & s_{11} & \cdots & s_{LL} \end{vmatrix} \cdot \begin{vmatrix} f(0) \\ f(1/\sigma) \\ \vdots \\ f((L-1)/\sigma) \end{vmatrix} \equiv Sg, \quad \text{Eq. 4}$$

where "$\sigma/2$" represents the bandwidth of the signal "f(x);" and "S" represents the sin c matrix with entries $s_{ij}$=sin c($\sigma$ $(x_i-j/\sigma)$). If the matrix S is well conditioned, then the seismic data at regular offsets may be computed by standard matrix inversion, as described below:

$$g = S^{-1}h. \quad \text{Eq. 5}$$

Otherwise, a least squares minimum norm inversion may be used, as set forth below:

$$g = (S^T W_1 S + W_2)^{-1} S^T W_1 h, \quad \text{Eq. 6}$$

where "$W_1$" represents usually chosen as a diagonal matrix whose "$m^{th}$" diagonal entry is the Jacobian weight $\Delta x_m = x_{m+1} - x_m$; and "$W_2$" represents usually chosen as a small multiple of identity matrix, i.e., $W_2 = \epsilon^2 I$.

An interpolator in accordance with Eq. 6 has been described by J. L. Yen in an article entitled, "Non-Uniform Sampling of Bandwidth-Limited Signals." IRE Trans. Circuit Theory, CT-3 251-257 (1956). It is sometimes referred to as Yen's Interpolator of Type 1.

Many interpolators that are used in seismic data processing are variations of the Yen's interpolator of Type 1. For example, interpolators are described in Duijndam, J. J. W., Schonewille, M. A., Hindriks, C. O. H., "Irregular and Sparse Sampling in Exploration Seismology," which is a chapter of L. Zhang, NONUNIFORM SAMPLING: THEORY AND PRACTICE, Kluwer Academic/Plenum Publishers, New York, USA (2001). The regularization in Duijndam is formulated as a spectral domain problem, and the spectrum of the signal is estimated by taking a non-uniform Fourier transform of the irregular samples. The regularized samples are constructed by using inverse discrete Fourier transformation. It can be shown that this regularization technique is exactly equivalent to Yen's Interpolator of Type 1.

A variant of Duijndam's interpolator is described in Zwartjes, P. M. and M. D. Sacchi, 2004, "Fourier Reconstruction of Non-Uniformly Sampled, Aliased Data," 74$^{th}$ Ann. Internat. Mtg., Soc. Of Expl. Geophys. (1997-2000). Zwartjes' interpolator involves a least squares inversion of the Fourier transformation instead of using an inverse discrete Fourier transform. To this purpose, a cost function is defined, which also involves a non-quadratic penalty term to obtain a parsimonious model.

Another interpolator is described in Hale, I. D., "Resampling Irregularly Sampled Data," Stanford Exploration Project, SEP-25, 39-58 (1980). Hale's interpolator is based on a more general version of Yen's Interpolator, where a space limited signal assumption is not used. In that case, the uniform samples $f(m/\sigma)$ may be determined by solving a matrix equation similar to Eq. 6. Hale discloses replacing the entries in the inverse matrix by their locally computed approximations.

The interpolators based on Yen's first theorem usually provide satisfactory results on non-aliased signals that have little high-wavenumber content. However, their performance typically degrades significantly when the interpolated signal has a substantial amount of high wavenumber spectral content. Another shortcoming of the interpolators based on Yen's first theorem is that in order to solve Eq. 4, at least as many irregular sampling positions as regular sampling positions are required. Hence, if some seismic traces are dropped out, traces which reside at further locations typically are used to solve the system of equations given by Eq. 4. Usually this degrades the accuracy of the interpolated sample values. Further, although Yen's first interpolator is exact for infinite length signals, it is an approximation when only a finite extent of the signal is available for interpolation.

Another interpolator has been described in Yen, J. L., "Non-Uniform Sampling of Bandwidth-Limited Signals," IRE Trans. Circuit Theory, CT-3, 251-257 (1956) and in U.S. patent application Ser. No. 12/518,533, entitled, "REGULARISATION OF IRREGULARLY SAMPLED SEISMIC DATA" which was filed on Jun. 10, 2009 and is hereby incorporated by reference in its entirety. This interpolator is sometimes referred to as Yen's Interpolator of Type 4. Given N=L arbitrary positions of seismic receivers $x_m$ and corresponding signal values $f(x_m)$, the seismic signals can be interpolated to N'=L desired or nominal receiver positions $y_k$ using the following relationship:

$$h_L(y_k) = \sum_{m=1}^{L} \sum_{n=1}^{L} \gamma_{mn} f(x_n) \varphi(y_k, x_m), \quad \text{Eq. 7}$$

where "$y_{mn}$" represents the (m,n)-th element of the inverse of a matrix $\Gamma$. The matrix $\Gamma$ has as its (i,j)-th element $\phi(x_i x_j)$ with $\phi(y,x)$ being equal to sin c($\sigma(y-x)$). The advantage of this interpolator is that the interpolator minimizes the least squares interpolation error in the spectral domain in cases where no prior information is available on signal except for that it is band limited. However, if prior information on the data is available, e.g., when data are known to be not full band (Bandwidth=Nyquist), smaller interpolation errors may be obtained by exploiting the prior information.

In accordance with embodiments of the invention described herein, for purposes of obtaining an interpolated set of seismic data at uniformly spaced locations, an interpolator is used which models the interpolated seismic data as a stochastic, or random, process. This random process is characterized by the seismic data measurements that have been acquired at non-uniformly-spaced locations and an interpolation error, as described below:

$$h(y) = \sum_m \alpha_m h(x_m) + \sum_m \beta_m h'(x_m) + w(y), \quad \text{Eq. 8}$$

where "$x_m$" represents to the irregular, or non-uniformly, spaced sensor locations; "h(y)" represents the interpolated measurement at an arbitrary position "y"; "$h(x_m)$" represents the pressure data measurement acquired at the $x_m$ location; "$\alpha_m$" represents a coefficient to be determined, as described below; "$h'(x_m)$" represents the pressure gradient data (i.e., the particle motion data measurement) acquired at the $x_m$ location; "$\beta_m$" represents a coefficient to be determined, as described below; and "w(y)" represents the interpolation error. It is noted that the measurements may be two-dimensional (2-D) or three-dimensional (3-D) measurements, depending on the particular embodiment of the invention.

For purposes of clarity, the problem has been formulated herein for co-located sensor pairs. However, the techniques and systems that are described herein may be generalized to non-co-located sensors. Thus, many variations are contemplated and are within the scope of the appended claims.

The statistically optimal (in the least-squares sense) estimate of h(y) may be obtained by minimizing the variance of the interpolation error, as described below:

$$\mathrm{Var}[w(y)] = E\left[\left|h(y) - \sum_m \alpha_m h(x_m) - \sum_m \beta_m h'(x_m)\right|^2\right], \quad \text{Eq. 9}$$

where "Var[w(y)]" represents the variance of the interpolation error; and "E[ ]" represents the statistical expectation operation, where the random process is assumed for this example to have a mean of zero.

As a more specific example, if an assumption is made that the random process is wide sense stationary (WSS), then its autocorrelation function may be expressed as follows:

$$E[h(x_m)h^*(x_n)] = R_{hh}(x_m - x_n), \quad \text{Eq. 10}$$

where "*" represents complex conjugation; and "$R_{hh}$" represents the autocorrelation function. Using this notation, the variation of the interpolation error may be expressed as follows:

$$\begin{aligned}
\mathrm{Var}[w(y)] = {}& R_{hh}(0) - \sum_m \alpha_m R_h(x_m - y) - \\
& \sum_m \beta_m \frac{\partial R_h(x_m - y)}{\partial x_m} - \sum_m \alpha_m^* R_h(y - x_n) + \\
& \sum_m \sum_n \alpha_m \alpha_n R_h(x_m - x_n) + \\
& \sum_m \sum_n \beta_m \alpha_n^* \frac{\partial R_h(x_m - x_n)}{\partial x_m} - \\
& \sum_m \beta_n^* \frac{\partial R_h(y - x_n)}{\partial x_n} + \\
& \sum_m \sum_n \alpha_m \beta_n \frac{\partial R_h(x_m - x_n)}{\partial x_n} + \\
& \sum_m \sum_n \beta_m \beta_n^* \frac{\partial R_h(x_m - x_n)}{\partial x_m \partial x_n} \\
= {}& R_{hh}(0) - g^H \theta - \theta^H g + \theta^H \Pi \theta,
\end{aligned} \quad \text{Eq. 11}$$

In Eq. 11, the parameters θ, g and Π are the following:

$$\theta = \begin{bmatrix} a \\ b \end{bmatrix}, \quad \text{Eq. 12}$$

$$g = \begin{bmatrix} r \\ -r' \end{bmatrix}, \text{ and} \quad \text{Eq. 13}$$

$$\Pi = \begin{bmatrix} R & R' \\ -R' & R'' \end{bmatrix}, \quad \text{Eq. 14}$$

where the parameters in Eqs. 12, 13 and 14 may be represented as follows:

$$a_m = \alpha_m, \quad \text{Eq. 15}$$

$$b_m = \beta_m, \quad \text{Eq. 16}$$

$$r_m = R_{hh}(y - x_m), \quad \text{Eq. 17}$$

$$R_{mn} = R_{hh}(x_m - x_n), \quad \text{Eq. 18}$$

$$R'_{mn} = R'_{hh}(x_m - x_n), \text{ and} \quad \text{Eq. 19}$$

$$R''_{mn} = R''_{hh}(x_m - x_n). \quad \text{Eq. 20}$$

The calculated interpolation parameters $\alpha_m$ and $\beta_m$ may be found by minimizing the variance of the interpolation error by solving the following set of normal equations:

$$\Pi \theta = g. \quad \text{Eq. 21}$$

Figure 2:
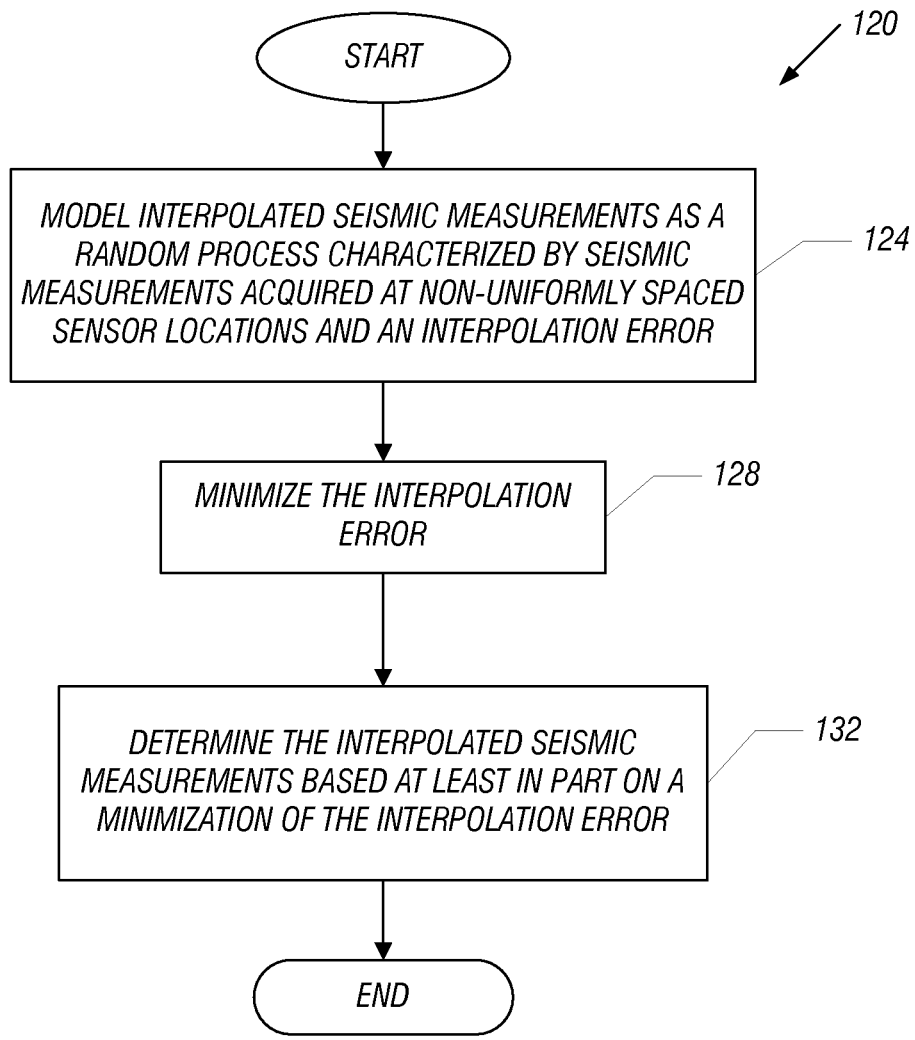
FIGS. 2 and 3 are flow diagrams depicting techniques to interpolate seismic data according to embodiments of the invention.
Figure 3:
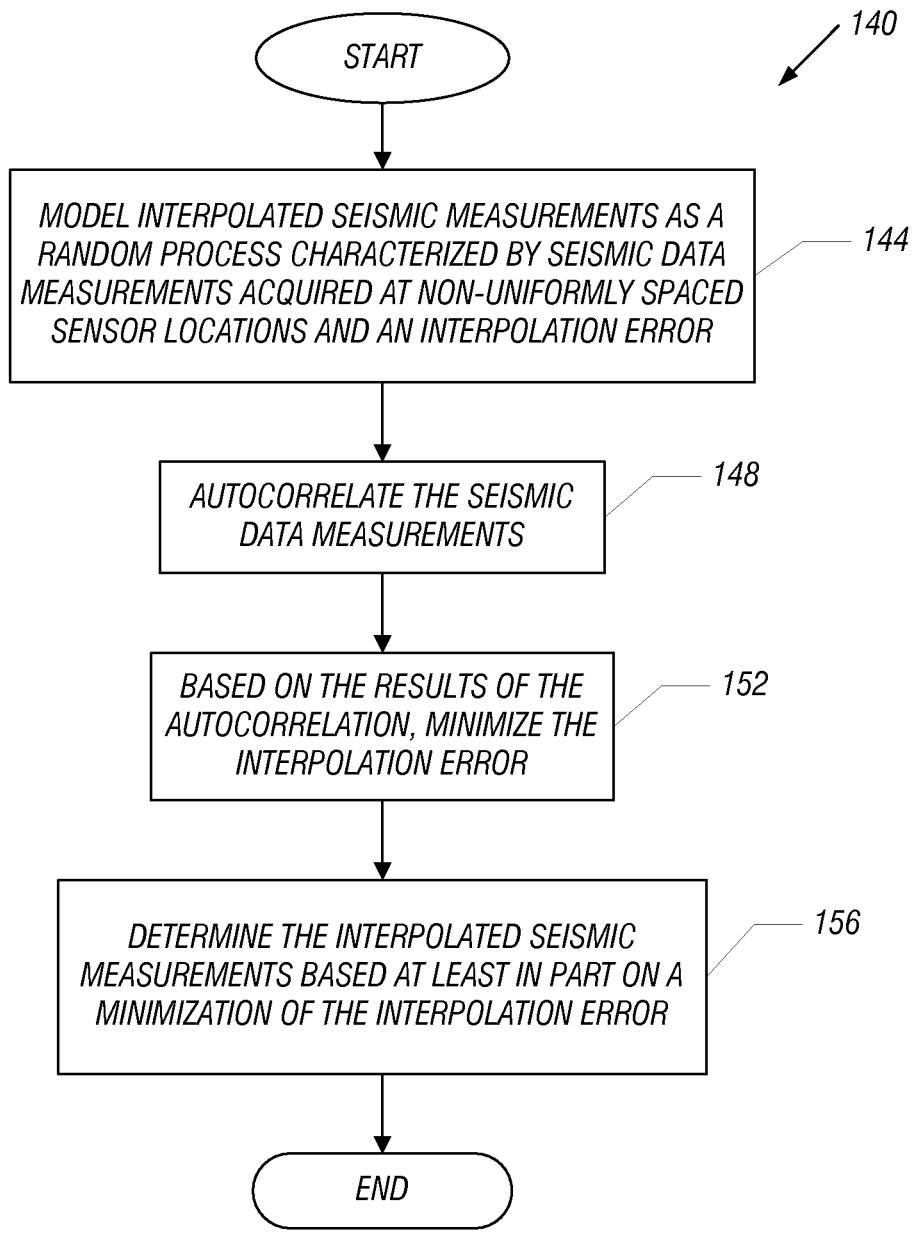

Referring to FIG. 2, thus, to summarize, a technique 120 may be performed in accordance with embodiments of the invention for purposes of interpolating seismic measurements from actual seismic measurements that were acquired at non-uniformly spaced sensor locations. Pursuant to the technique 120, the interpolated seismic measurements are modeled (block 124) as a random process that is characterized by the acquired seismic measurements and an interpolation error. The technique 120 includes minimizing the interpolation error, pursuant to block 128, and determining (block 132) the interpolated seismic measurements based at least in part on the minimization of the interpolation error.

As described above, a more specific technique 140 may be used in accordance with some embodiments of the invention for purposes of determining the interpolated seismic measurements. The technique 140 includes modeling (block 144) the interpolated seismic measurements as a random process that is characterized by the acquired seismic data and an interpolation error. The acquired seismic measurements are autocorrelated, pursuant to block 148, and the interpolation error is minimized based on the results of the autocorrelation, pursuant to block 152. The interpolated seismic measurements may then be determined, pursuant to block 156, based at least in part on the minimization of the interpolation error.

It is noted that the interpolation may be performed in the frequency (f) and space (x,y,z) domain. For determination in the frequency domain, the measurements may be divided among frequency bands such that interpolation is performed for each frequency band independently. Each frequency band may have a different associated spatial bandwidth.

Figure 4:
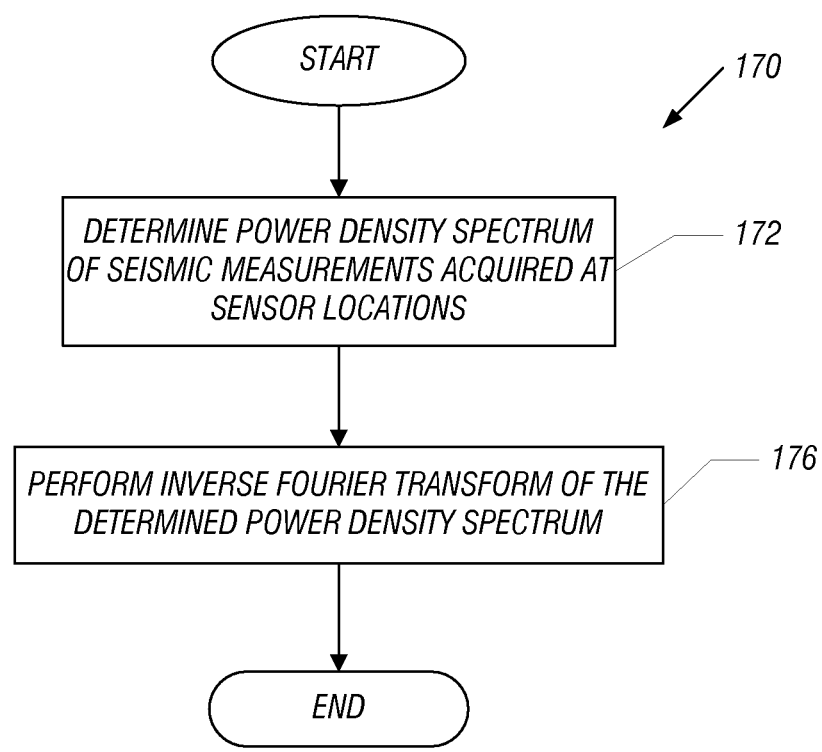
FIGS. 4, 5 and 6 are flow diagrams depicting techniques to perform autocorrelation of measured seismic data according to embodiments of the invention.

The autocorrelation of the acquired seismic measurements may be performed in a number of different ways, depending on the particular embodiment of the invention. Referring to FIG. 4, in accordance with some embodiments of the invention, a technique 170 includes determining a power density spectrum of the acquired seismic measurements, pursuant to block 172 and performing an inverse Fourier transform of the determined power density spectrum, pursuant to block 176, for purposes of performing the autocorrelation.

Figure 5:
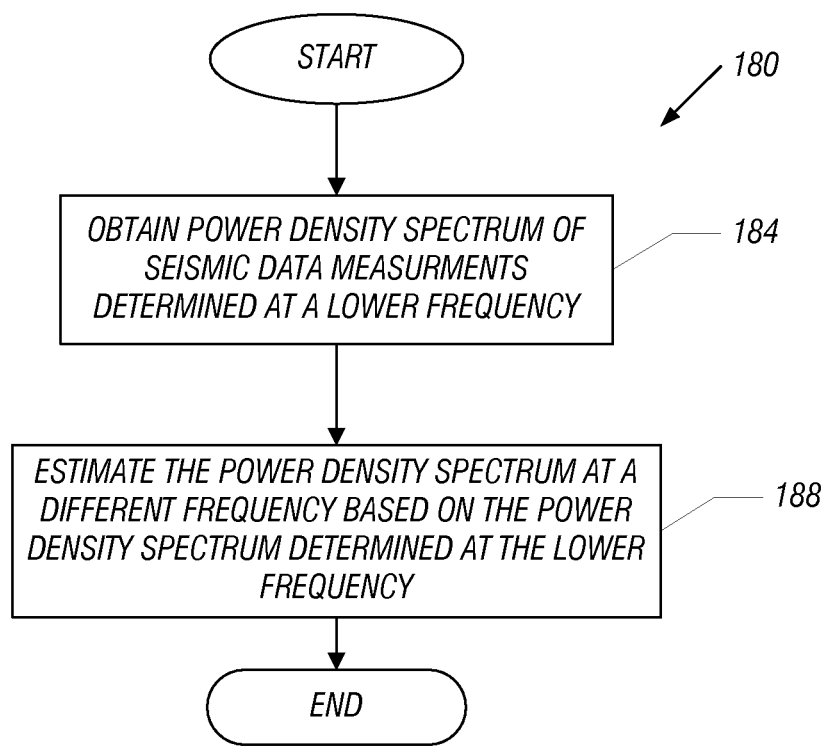

In some applications, the power density spectrum may not be known exactly. Therefore, the spectrum may be estimated from the acquired seismic measurements by using spectrum estimation algorithms, as can be appreciated by one of skill in the art. Referring to FIG. 5, in accordance with some embodiments of the invention, a technique 180 may be used for purposes of estimating the power density spectrum. Pursuant to the technique 180, a power density spectrum, which was previously attained at a lower frequency is obtained, pursuant to block 184. In this regard, the spectrum may have already been computed at a lower frequency. The technique 180 includes estimating (block 188) the power density spectrum at a different frequency based at least in part on the spectrum that was already determined at the lower frequency.

Figure 6:
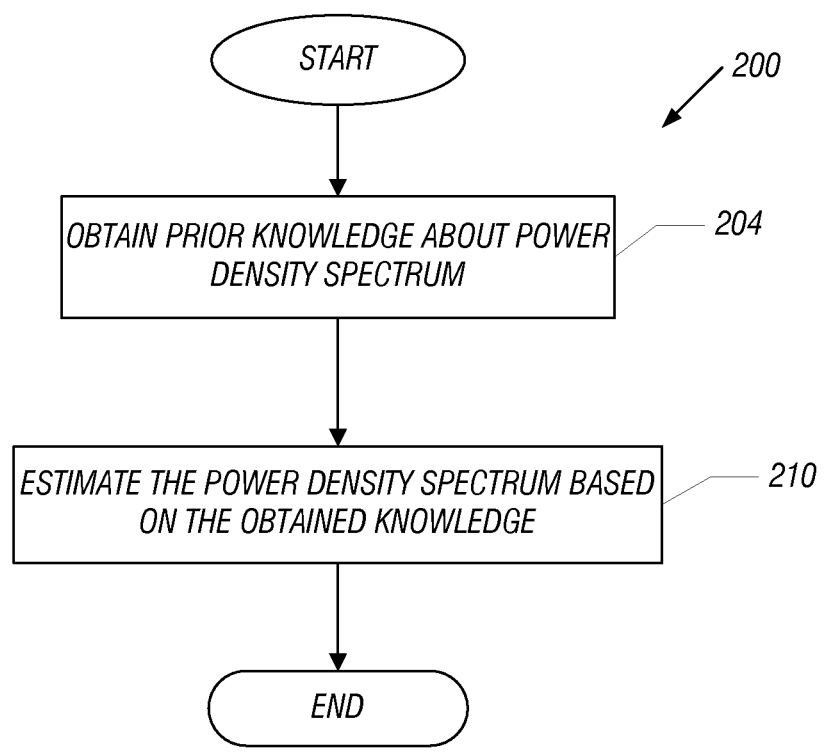

Referring to FIG. 6, in accordance with other embodiments of the invention, in some applications where the power density spectrum is not exactly known, the spectrum may be modeled by using prior knowledge about the spectrum. In this regard, a technique 200 includes obtaining prior knowledge about the power density spectrum, pursuant to block 204 and estimating (block 210) the power density spectrum based on the obtained knowledge. As a more specific example, if it is known that the acquired seismic data measurements are band-limited, then a model for the autocorrelation function may be described, in its simplest form, as follows:

$$R_{hh}(x) = K \sin c(\sigma x), \quad \text{Eq. 22}$$

where "sin c(σx)" represents the sin c function, "K" represents a constant and "σ" represents twice the Nyquist rate of the bandwidth of the measured seismic data.

In some applications, the seismic data measurements may only include pressure data and not particle motion data. In these applications, the $\beta_m$ coefficient is set equal to zero, and the $\alpha_m$ is determined as the solution of the following normal equation:

$$Ra = r. \quad \text{Eq. 23}$$

If Eq. 21 is over-determined, then a minimum norm solution may be obtained by determining the singular value decomposition of Π. As another example, if Eq. 21 is over-determined, a regularized solution may be obtained by using Tikhonov regularization.

It is noted that the model of the power density spectrum need not be band-limited. Therefore, in the presence of sufficient information about the signal's spectrum, the power density spectrum estimation algorithm may not be limited by the Nyquist rate.

As an example of another embodiment of the invention, in the presence of noise, the statistics of the noise may be incorporated into the interpolator. Other variations are contemplated and are within the scope of the appended claims.

Referring to FIG. 7, in accordance with some embodiments of the invention, a seismic data processing system 320 may perform at least part of the techniques that are disclosed herein for purposes interpolating seismic measurements (pressure and particle motion measurements, as example) at uniformly spaced locations based on seismic measurements that were acquired at non-uniformly spaced sensor locations. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to the acquired pressure and/or particle motion measurements. Thus, in accordance with embodiments of the invention described herein, the processor 350, when executing instructions stored in a memory of the seismic data processing system 320, may receive multi-component data that is acquired by multi-component seismic sensors while in tow. It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various input and/or output data sets involved with the techniques 120, 140, 170, 180 and/or 200, as indicated by reference numeral 348. The memory 340 may store program instructions 344, which when executed by the processor 350, may cause the processor 350 to perform one or more of the techniques that are disclosed herein, such as the techniques 120, 140, 170, 108 and/or 200 and display results obtained via the technique(s) on a display (not shown in FIG. 7) of the system 320, in accordance with some embodiments of the invention.

Many variations are contemplated and are within the scope of the appended claims. For example, in accordance with embodiments of the invention, the streamers may be in any configuration, such as an over/under configuration, a three-dimensional spread, etc. Furthermore, in accordance with other embodiments of the invention, the seismic sensors may be disposed in a sensor cable, such as an ocean bottom cable.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    modeling interpolated seismic measurements as a random process characterized by pressure measurements and particle motion measurements acquired at sensor locations, and an interpolation error; and
    processing the pressure measurements and the particle motion measurements in a processor-based machine to determine the interpolated seismic measurements based at least in part on a minimization of the interpolation error; and:
    further modeling the interpolated seismic measurements based on the seismic measurements and the interpolation error.

2. The method of claim 1, wherein the sensor locations comprise non-co-located sensor locations.

3. The method of claim 1, wherein processing the pressure measurements and the particle motion measurements comprises determining the interpolated seismic measurements at locations associated with a uniform sampling.

4. The method of claim 1, wherein the sensor locations comprise locations associated with a non-uniform sampling.

5. The method of claim 1, wherein the act of minimizing the interpolation error comprises minimizing a variation of the interpolation error.

6. The method of claim 1, wherein processing the pressure measurements and the particle motion measurements comprises calculating autocorrelation of the seismic measurements at the sensor locations.

7. The method of claim 6, wherein the act of calculating the autocorrelation comprises determining a power spectral density of the seismic measurements acquired at the sensor locations.

8. The method of claim 7, wherein the autocorrelation of seismic measurements is computed as the inverse Fourier transform of an a priori model of the power spectral density of the seismic measurements.

9. The method of claim 7, wherein the power spectral density of the seismic measurements is modeled as a constant for band-limited measurements.

10. The method of claim 7, wherein the act of determining the power spectral density comprises determining the power spectral density at a first frequency based on a power spectral density determined at a different second frequency.

11. The method of claim 1 further comprising:
dividing the measurements among frequency bands; and
performing the interpolation for each frequency band independently.

12. The method of claim 11, wherein each frequency band has a different associated spatial bandwidth.

13. The method of claim 12, wherein the different spatial bandwidths are determined by the speed of propagation of the signals.

14. The method of claim 1, wherein the measurements are acquired in a two-dimensional (2D) spatial plane.

15. The method of claim 1, wherein the measurements are acquired in a three-dimensional (3D) spatial plane.

16. The method of claim 1, wherein the interpolated seismic measurements comprise three particle motion components and a pressure component.

* * * * *